J. HORNER, Jr.
UNDERGROUND TELEGRAPH-LINES.
No. 173,170.  Patented Feb. 8, 1876.
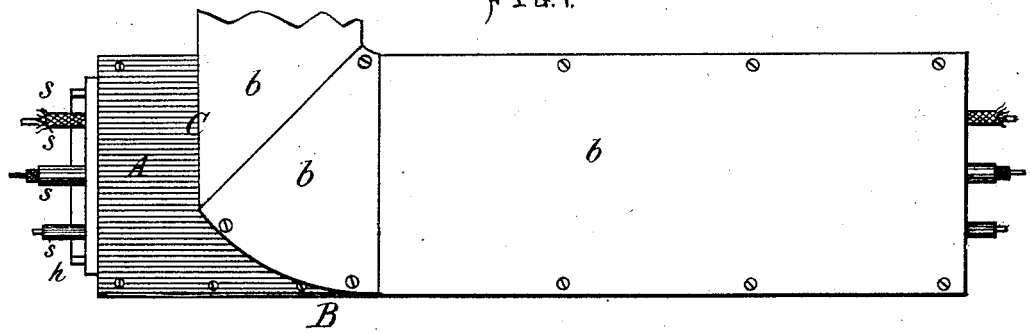
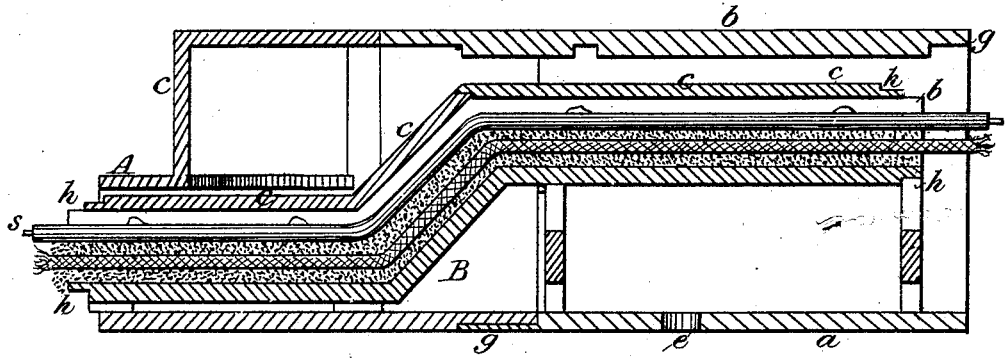
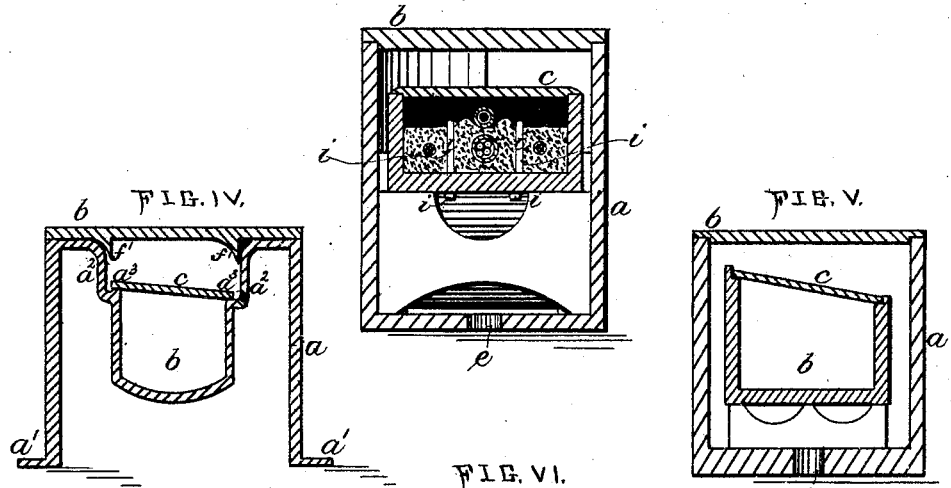
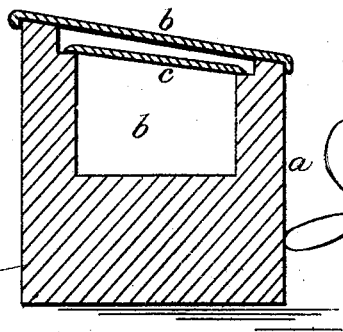
Witnesses.
F. B. Townsend.
A. O. N. Johnson.
Inventor
Joshua Horner Jr.

UNITED STATES PATENT OFFICE.

JOSHUA HORNER, JR., OF BALTIMORE, MARYLAND.

IMPROVEMENT IN UNDERGROUND TELEGRAPH-LINES.

Specification forming part of Letters Patent No. 173,170, dated February 8, 1876; application filed April 19, 1875.

*To all whom it may concern:*

Be it known that I, JOSHUA HORNER, Jr., of Baltimore, and State of Maryland, have invented certain new and useful Improvements in Underground Telegraph-Lines; and I do hereby declare that the following is a full, clear, and exact description thereof, which will enable others skilled in the art to which it pertains to make and use the same, reference being had to the accompanying drawing, and to the letters of reference marked thereon, which form a part of this specification.

The object of my invention is to so construct the curbs of streets that they may receive the telegraph-wires, which are generally suspended upon poles, throughout cities and villages, and to also provide for the continuation of the wires at the street-crossings, in such a manner that they shall both be protected from injury by vehicles and in other ways, and also from the weather.

My invention consists in the manner or means whereby I accomplish the reception of the wires within the curbs, and provide for their crossing the streets, and not only perfectly protect them from injury, but also from the effect of weather, and insulate them at every point, and so adapt the curb or receptacle that the said wires may be reached in order to lay, repair, remove, or examine them at any place along the line, as necessity may require.

Figure 1 is a top view of the curb, showing a street corner, or corner where the curb turns at a right angle, with the box holding wires, the latter being shown upon the left as depressed for crossing a street, as hereinafter described. Fig. 2 is a vertical longitudinal section of the same. Fig. 3 is a cross-section of a curb, showing one way in which I contemplate making the curb with the box supported inside thereof, and the position of the insulated wires within the box. Figs. 4, 5, and 6 are modifications of the curb, and of the position and construction of the internal box or wire receptacle.

The curb $a$, as I propose to construct it, is made in sections, or short lengths, and hollow throughout its entire length, and either of cast-iron, wrought-iron, rolled hollow after the usual way of constructing hollow girders, of cast artificial stone, of natural stone cut to the form desired, or of any other suitable material.

In Figs. 3 and 5 I have shown the curb $a$ as being of trough shape—that is, having vertical sides and connecting bottom.

In Fig. 4 I have shown the curb made more in the form of a girder—that is, having no bottom, but vertical sides and lateral supporting-flanges $a'$, and in this instance I form the box for the telegraph-wires integral with the curb $a$.

It will be observed that in Figs. 4 and 6 I represent the curb and box as being integral, but in Figs. 3 and 5 as separate and removable one from the other. When the boxes $b$ are made removable, suitable supports $b'$ are placed in the curb under them, or they might be supported by a flange or bracket upon the internal surface of the curb, or in any other suitable manner to accomplish this end. The internal box $b$, of whatever construction, is provided with a removable cover, $c$, and its edges either fit into rabbets upon the top of either upper side of the box or into grooves, dovetails, or it may be laid flat, or made to fit over the edges like the cover of a box, or in any other suitable way.

In Fig. 4 the supports of the box are curved, as $a^2$, and form shoulders $a^3$, upon which the cover $c$ is laid in an inclined position, in order to shed water that might get into the curb, by permitting it to run off through the holes $d$, provided for the purpose in the curves $a^2$.

In Figs. 3 and 5 the cover $c$ is shown as situated both level and inclined, and in case water should fall upon these covers it could escape over the sides, between the walls of the curb and box, and out of the curb through holes $e$ in the bottom thereof. The curb has a removable cover, $f$, which may be fitted to the sides in a variety of ways, several of which are shown in the drawings; but it is evident that there are many other joints or connections that could be adapted with equal advantages without departing from the spirit of my invention.

The upper surface of the curb or cover can be made level or inclined, as may be desired, or the sides of the curb may be made of equal heights, and the inclination of the cover provided for by its being made thicker upon one side than at the other, or otherwise.

In Fig. 4 the cover $f$ has upon its under side projecting lugs or ribs $f'$, that fit against the internal surfaces of the box-supports, and thus hold the former in place upon the curb, which, in some instances, may be found advantageous.

The sections of the curb are formed at their ends with tenons, rabbets, flanges, collars, or otherwise, as shown at $g$, (see Fig. 2,) to fit one to the other, and provide for their being riveted, bolted, or otherwise fastened at this point, to form a continuous curb, and the boxes $b$ can be fitted in like manner, as shown at $h$, or otherwise, as may be desired.

In order to have the curb form a continuous conduit and receptacle for the box $b$ containing the wires at the street-crossings, the box is inclined downward, as at B, and runs along near the bottom of the curb. The curb ends at C, and its upper surface is then depressed, as shown at A, and continues across the street, the base or bottom of the curb being straight and joining with the base of the curb upon the opposite side of the street. This depressed portion for the crossings is made hollow, and contains the box $b$, as before set forth, being only upon a lower level. The depressed portion is sunk in the street, with its upper surface left flush with the street or below it.

This depressed point A is generally made of metal and in short sections, and has a removable cover, and the box $b$ is also in sections, as before set forth. Inside of the depressed curb A, or the curb $a$ situated along the edge of the sidewalk, are placed strengthening ribs or stays when deemed necessary. The box $b$ is provided with openings, in which pegs $i$ are placed to separate the wires and keep them straight. The box $b$, whether removable or not, being situated in the curb $a$ or A, and the section-joints being placed together, the joints are upon the inside overlaid with broad strips of asphalt or bitumen treated cloth. The bottom throughout this box or trough is then thickly coated with hot bitumen or asphalt, in order to thickly seal the bottom and isolate the box and make it water-proof. Insulated wire or cable is then laid in the box B, upon the bed before described and between the pegs $i$, and when the desired number are laid therein the box is filled up with hot bitumen, which surrounds the wires and incloses them, and protects them from the action of the weather, heat, cold, damp, and other undue influences. The lid of the box or trough $b$ is then properly adjusted to its seat, and, if desired, sealed with bitumen or other suitable substance, and thus the box is made into a continuous water-tight receptacle throughout its entire length, and still so made that it can be opened, when necessary, by the workmen in case the wires need repair, or for other purposes.

The box, it is evident, might be coated heavily with bitumen or other suitable substance, and hermetically sealed, in which case the embedding of the wires within the box might, perhaps, be dispensed with altogether when insulated wires or cables are used; or these wires or cables, when insulated or placed in lead or other tubing, might be placed in the curb without the box, and the curb or box-cover sealed or not, as found desirable. When the insulated cables or wires are not embedded the box should be sealed hermetically, and made to exclude all moisture from the interior.

In Fig. 6, which represents an artificial-stone curb, the box $b$ should be heavily coated upon the bottom and sides with bitumen or other suitable substance, which will insulate it and seal the section-joints of the curb and box. Insulated cable, or cable confined in pipes or insulated terra-cotta tubing, are then placed within the box, the lid $c$ being then placed and sealed hermetically by a coating of asphalt, so as to shed all moisture that might penetrate.

The upper lid $f$ may be sealed, if desired, or simply held in place by its grooved-edge rabbets, or otherwise. Between the boxes and curbs a space is generally left for moisture to escape.

By my construction of curbing the great inconvenience and expense of having to take up trunks in the center of streets, which hold the wires, is overcome, and, as these trunks and wires now in use run longitudinally of the streets, they are constantly being interfered with, taken up, broken, and forced out of place, which interferes with the wires, and often prevents them being used for a time, or permits them to come in contact with water or snow, and thus become useless. But as the curbing of streets is seldom disturbed, even in laying water or gas pipes, or new pavement, my invention is constantly applicable for the purpose, and the wires are always protected and ready for use.

When my device is depressed to cross the street it will be found unnecessary to take it up under any circumstances, but it could be, if necessary, with facility, and relaid when desired. With this construction, the top of the curb being removable, the continuous wires may be removed, repaired, or examined when desired, and the many inconveniences and expensive plans greatly improved.

What I claim is—

1. A hollow curb $a$, having a cover, in combination with an inner receptacle or box, $b$, also having a cover, $c$, as and for the purpose set forth.

2. The curb $a$, constructed with a removable top, and having a depressed portion, A, crossing a street, as described.

3. A hollow curb, $a$, having a removable cover, $f$, and made in sections, in combination with a box or trough, $b$, also in sections, as set forth.

4. The combination of the curb $a$ and box $b$ therein, with the wires $j$ insulated and held, as set forth.

5. The box $b$ situated in the curb of a street and insulated, as set forth.

JOSHUA HORNER, J

Witnesses:
 C. H. SLICER,
 W. B. TUCKER.